United States Patent
Xuan

(10) Patent No.: US 10,989,698 B2
(45) Date of Patent: *Apr. 27, 2021

(54) HIGH RESOLUTION MSI BASED QUANTIFICATION

(71) Applicant: Thermo Fisher Scientific (Bremen) GmbH, Bremen (DE)

(72) Inventor: Yue Xuan, Bremen (DE)

(73) Assignee: Thermo Fisher Scientific (Bremen) GmbH, Bremen (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/866,737

(22) Filed: May 5, 2020

(65) Prior Publication Data

US 2020/0264142 A1 Aug. 20, 2020

Related U.S. Application Data

(63) Continuation of application No. 15/885,752, filed on Jan. 31, 2018, now Pat. No. 10,656,127.

(30) Foreign Application Priority Data

Feb. 3, 2017 (GB) ...................................... 1701857

(51) Int. Cl.
*H01J 49/00* (2006.01)
*G01N 30/72* (2006.01)
(Continued)

(52) U.S. Cl.
CPC ..... *G01N 30/7233* (2013.01); *G01N 30/8675* (2013.01); *H01J 49/0031* (2013.01);
(Continued)

(58) Field of Classification Search
CPC . G01N 30/72; G01N 30/7233; H01J 49/0031; H01J 49/0027; H01J 49/0036;
(Continued)

(56) References Cited

U.S. PATENT DOCUMENTS 6,329,652 B1 * 12/2001 Windig .............. G01N 30/8624
250/282
6,504,148 B1 1/2003 Hager
(Continued)

FOREIGN PATENT DOCUMENTS

CN 105051526 A 11/2015
CN 105051530 A 11/2015
(Continued)

OTHER PUBLICATIONS

Anonymous, "Unmatched analytical performance Revolutionary MS architecture Thermo Scientific Orbitrap Fusion Tribrid Mass Spectrometer," 12 pgs, Jan. 1, 2016.
(Continued)

*Primary Examiner* — Sean M Luck
(74) *Attorney, Agent, or Firm* — Charles B. Katz

(57) ABSTRACT

A data independent acquisition method of mass spectrometry for analysing a sample as it elutes from a chromatography system is disclosed. The method comprises selecting a precursor mass range, and performing a plurality of MS1 scans and sets of MS2 scans across the precursor mass range. Each of the MS1 scans uses a mass analyser operated at a first, relatively higher resolution, for identification and/or quantitation of the sample in the MS1 domain. The set of MS2 scans comprises performing MS2 scans of fragmented mass range segments performed with the mass analyser, operated at a second, relatively lower resolution. In the method, the MS1 scans are interleaved throughout the performing of the set of MS2 scans such that the MS1 scans provide a mass chromatogram of the sample. The ratio of the number of MS1 scans to sets of MS2 scans performed across the chromatographic peak width is at least 3:1.

24 Claims, 5 Drawing Sheets

(51) Int. Cl.
*H01J 49/10* (2006.01)
*H01J 49/42* (2006.01)
*G01N 30/86* (2006.01)

(52) U.S. Cl.
CPC .......... *H01J 49/0081* (2013.01); *H01J 49/10* (2013.01); *H01J 49/425* (2013.01)

(58) Field of Classification Search
CPC .... H01J 49/004; H01J 49/0045; H01J 49/005; H01J 49/0054; H01J 49/0059; H01J 49/0063; H01J 49/0068; H01J 49/0072; H01J 49/0077; H01J 49/0081
See application file for complete search history.

(56) References Cited

U.S. PATENT DOCUMENTS

| | | |
|---|---|---|
| 6,717,130 B2 | 4/2004 | Bateman et al. |
| 6,982,414 B2 | 1/2006 | Bateman et al. |
| 7,800,055 B2 | 9/2010 | Geromanos et al. |
| 7,999,223 B2 | 8/2011 | Makarov et al. |
| 8,809,770 B2 | 8/2014 | Bonner et al. |
| 8,809,772 B2 | 8/2014 | Bonner et al. |
| 8,841,605 B2 | 9/2014 | Makarov |
| 9,281,171 B2 | 3/2016 | Bateman et al. |
| 9,343,276 B2 | 5/2016 | Tate et al. |
| 9,837,255 B2 | 12/2017 | Stephenson, Jr. et al. |
| 2001/0007349 A1 | 7/2001 | Nagai |
| 2003/0001088 A1 | 1/2003 | Bateman et al. |
| 2007/0023629 A1 | 2/2007 | Makarov |
| 2010/0311176 A1 | 12/2010 | Williamson et al. |
| 2012/0256083 A1 | 10/2012 | Kovtoun |
| 2012/0261568 A1 | 10/2012 | Coon et al. |
| 2013/0126721 A1 | 5/2013 | Carlton et al. |
| 2013/0206979 A1 | 8/2013 | Bonner et al. |
| 2013/0334414 A1 | 12/2013 | McAlister et al. |
| 2014/0252218 A1* | 9/2014 | Wright ................ H01J 49/0036 250/282 |
| 2014/0346345 A1 | 11/2014 | Makarov |
| 2015/0021472 A1 | 1/2015 | Makarov |
| 2015/0028197 A1 | 1/2015 | Grinfeld et al. |
| 2015/0090874 A1 | 4/2015 | Larson et al. |
| 2015/0130810 A1 | 5/2015 | Yasuda |
| 2015/0287585 A1 | 10/2015 | Kovtoun et al. |
| 2018/0224406 A1 | 8/2018 | Xuan |

FOREIGN PATENT DOCUMENTS

| | | |
|---|---|---|
| EP | 2775509 A2 | 9/2014 |
| GB | 2363249 B | 8/2002 |
| WO | WO2010/136533 A1 | 12/2010 |
| WO | WO2012/035412 A2 | 3/2012 |
| WO | WO2012/175517 A2 | 12/2012 |
| WO | 2013/076307 A2 | 5/2013 |
| WO | WO2013/110587 A2 | 8/2013 |
| WO | 2013171313 A1 | 11/2013 |

OTHER PUBLICATIONS

Chapman et al., "Multiplexed and data-independent tandem mass spectrometry for global proteome profiling," Mass Spectrometry Reviews, 33(6), 452-470, 2013.

Watson et al., "Introduction to mass spectrometry: instrumentation, applications, and strategies for data interpretation," John Wiley & Sons (ISBN: 978-0-470-51634-8, pp. 53-173, 2007

Xuan et al., "MS1-Based Quantification Optimization on Dia Methods on a Quadrupole-Orbitrap Mass Spectrometer", Poster Note 64738, 2016, https://tools.thermofisher.com/content/sfs/posters/PN-64738-MS1-Based-Quantification-ASMS2016-PN64738-EN.pdf.

Zhang et al., "Evaluation of Data-independent Acquisition (DIA) Approaches for Spiked Peptides in HeLa Digest on Q-OT-qIT Mass Spectrometer," Thermo Scientific, 7 pgs, 2016.

Zhang et al., "Quantitative Analysis of Targeted Proteins in Complex Sample Using Novel Data Independent Acquisition," Chinese Journal of Analytical Chemistry Volume Online English Edition of the Chinese Language Journal Chin J Anal Chem, 42(42), 1750-1758, 2014.

* cited by examiner

HIGH RESOLUTION MSI BASED QUANTIFICATION

CROSS REFERENCE TO RELATED APPLICATIONS

The present application is a continuation under 35 U.S.C. § 120 and claims the priority benefit of U.S. patent application Ser. No. 15/885,752, filed Jan. 31, 2018. The disclosure of the foregoing application is incorporated herein by reference.

FIELD OF THE INVENTION

The present invention relates to data independent analysis (DIA) of organic and in particular biological samples such as proteins, peptides, metabolites, lipids and the like. In particular it relates to a high resolution data independent identification and quantification technique with applications in proteomics, metabolomics, lipidomics and so forth.

BACKGROUNDS OF THE INVENTION

Mass spectrometry is a long established technique for identification and quantitation of often complex mixtures of large organic molecules. In recent years, techniques have been developed that allow analysis of a wide range of both biological and non-biological materials, with application across the fields of law enforcement (e.g. identification of drugs and explosives materials), environmental, scientific research, and biology (e.g. in proteomics, the study of simple and complex mixtures of proteins, with applications in drug discovery, disease identification and so forth).

Proteins, comprising large numbers of amino acids, are typically of significant molecular weight. Thus accurate identification and quantitation of the protein by direct mass spectrometric measurement is challenging. It is thus well known to carry out fragmentation of the precursor sample material. A variety of fragmentation techniques is known, which may result in the generation of different fragment ions from the precursor ions. Moreover, the fragmentation mechanism may be affected by different applied fragmentation energies.

A number of different arrangements are known for the production of fragment ions from precursors. For example, the TSQ™ triple quadruple group of devices sold by Thermo Fisher Scientific LLC comprises three quadrupoles supplied with sample ions usually from a liquid chromatograph (LC), for tandem mass spectrometry. The first quadrupole acts as a mass filter to select a range of precursor ions supplied from the LC. The second quadrupole causes fragmentation of the ions selected by the first quadrupole, typically through the use of a collision gas. The third quadrupole then acts as a mass filter, typically in scan mode, to allow a mass spectrum of abundance versus m/q (mass-to-charge ratio) to be obtained.

Instead of a triple quadrupole system, the final stage of mass analysis after fragmentation may be carried out using other devices, such as a Time-of-Flight mass spectrometer, a Fourier transform Ion Cyclotron Resonance (FT-ICR) Mass spectrometer, an orbital trapping mass spectrometer such the Orbitrap® or the like. Each different final stage mass analyser has its own advantages and disadvantages with respect, for example, to mass resolution, duty cycle, sensitivity, cost and so forth.

Analysis of samples can broadly be separated into data independent analysis/acquisition (DIA) and data dependent analysis/acquisition (DDA). DIA seeks to determine what is present in a sample of potentially unknown identity. To determine the molecular structure of sample molecules, the first mass filter in a tandem mass spectrometer is set to pass all ions within a selected range of m/z. This range of precursor ions is then fragmented in the second stage of the tandem mass spectrometer and the resulting fragments are subsequently analyzed in the third stage of the tandem mass spectrometer, which may be a linear quadrupole, a TOF device, or otherwise as noted above. In broadband DIA (also known as "all mass/all ion MS/MS"), tandem mass spectra are acquired by fragmentation of all of the ions that enter the mass spectrometer at a given time. Alternatively, ranges of m/z of the precursor ions can be sequentially isolated, fragmented and then the fragments detected.

DDA, by contrast, seeks to confirm that one or more species is/are present in a given sample. Methods of DDA identify a fixed number of precursor ion species, and select and analyse those via tandem mass spectrometry. The determination of which precursor ion species are of interest in DDA may be based upon intensity ranking (for example, the top ten most abundant species as observed by peaks in a precursor mass spectrum, hereafter referred to as "MS1"), or by defining an "inclusion list" of precursor mass spectral peaks (for example by user selection), from which fragment spectra—hereafter referred to as "MS2"—are always acquired regardless of the intensity ranking of the peak in the precursor mass spectrum (MS1). Still otherwise, an "exclusion list" of peaks in MS1 can be defined, for example by a user, based e.g. on prior knowledge of the expected sample contents.

DIA avoids the decisions necessary in DDA, by simply dividing the mass range of interest (typically user defined) into segments and obtaining MS2 spectra for each segment (other than in the specific case of broadband DIA noted above). With DIA, the acquisition of an MS1 precursor spectrum becomes more or less optional, since the parameters of the precursor selection window themselves carry information about the range of possible precursor ions.

Early DIA techniques were disclosed in patent applications by Micromass UK Ltd and Water Technologies Corporation, in their so-called MSE arrangements. The DIA techniques resulted from application of known triple quadrupole methods to quadrupole-TOF arrangements.

In U.S. Pat. No. 6,717,130, a technique is disclosed in which MS1 and MS2 are alternatively acquired by repeatedly switching the energy of the fragmentation cell. The technique relies upon separation of the sample molecules through different elution times in a chromatography environment. At the end of an experimental run, precursor and fragment ions are recognized by comparing the mass spectra in the two different fragmentation modes. Fragment ions are matched to particular precursor ions on the basis of the closeness of fit of their elution times, so that precursor ions can then be identified.

U.S. Pat. No. 6,982,414 discloses a development to the DIA technique in the '130 patent described above. Here, the energy applied to the fragmentation cell is again repeatedly switched so as to obtain both MS1 and MS2. However here MS1 and MS2 are obtained from both a first and a second sample separately.

The mass spectra are then compared and further analysis is carried out where precursor ions in MS1 from each sample, or fragment ions in MS2 from each sample, are expressed differently.

Finally U.S. Pat. No. 7,800,055 again employs switching between energy levels in the fragmentation chamber so as to generate MS1 and MS2 in alternating manner.

Comparison of the chromatographic peak shape of the precursor and fragment peaks is carried out to identify an association between precursor and fragment (product) ions.

An alternative approach to DIA, known as "SWATH", has been proposed in various patents to DH Technologies Development Pte. Ltd.

In U.S. Pat. No. 8,809,770, a DIA data set is acquired such that the data may subsequently be analyzed for a target substance. This contrasts with the idea of setting a target and then acquiring data only for that purpose. The method employs LC-MS and uses wide windows of precursor ions (e.g. >10, >15, >20 amu) for MS2, allowing the whole precursor space to be covered.

Again the '770 patent stresses the importance of retaining the fidelity of the chromatographic peaks in the MS2 spectrum, by appropriate setting of the windows. An MS1 spectrum is indicated to be optional.

As an example, the '770 patent describes a method—akin to single reaction monitoring (SRM)—for evaluation of the MS2 data of a precursor mass window as a function of retention time, and for subsequent comparison with a reference spectrum library.

U.S. Pat. No. 8,809,772 employs isolation windows for the precursor ions, of variable width, the width being dependent upon the precursor mass. The method trades off analysis speed (for a wide window) and sensitivity/specificity (for a narrow window).

U.S. Pat. No. 9,343,276 addresses drawbacks with the methods disclosed in U.S. Pat. No. 8,809,770 by scoring extracted ion chromatogram (XIC) peak candidates based on various criteria, in a comparison between the XIC fragment peaks with the MS1 information, such as mass accuracy, charge state, isotopic state, known neutral losses and so forth.

A common aspect of the approach in the MSE and SWATH techniques described above is that they seek to optimize measurements for good MS2 time resolution. To obtain sufficient data points across the LC peak for good quantitation, either a relatively wide precursor isolation window (24 Da)—as suggested in the MSE patents discussed above—or a variable width precursor isolation window (the preferred approach for the SWATH patents discussed above) needs to be employed.

The consequence is that the traditional database search—in which sample fragment spectra are compared against fragment spectra of known species in a library, as is the case with DDA—may not be well suited for DIA data analysis. In the case of the SWATH technique, a large spectral library must first be created (for the same or similar sample types) for targeted extraction of MS2 chromatograms from convoluted spectra, which is an expensive and time consuming task.

In "*MS1 Based Quantification Optimization on DIA Methods on a Quadrupole-Orbitrap Mass Spectrometer*", Yue Xuan et al (available at https://tools.thermofisher.com/content/sfs/posters/PN-64738-MS1-Based-Quantification-ASMS2016-PN64738-EN.pdf) a method of DIA analysis is disclosed in which a single MS1 scan is performed at a resolution of 120,000 across an m/z range of 350 to 1650 Th and a set of segmented MS2 scans across the whole mass range (350 to 1650) are performed at a resolution of 30,000 within a total duty cycle time of 2 seconds. The combined MS1 and MS2 duty cycle is repeated a number of times over the duration of an LC peak to provide a plurality of data points per peak for identification and quantification. The high resolution of the MS1 scan can distinguish the interferences from the analyte of interest.

Even then, for complex samples, the prior art DIA approaches require a high MS/MS scan speed and repetition rate, as well as relatively wide MS/MS windows, so that enough data points in the MS/MS domain are present for quantitation in the fragment domain, and for successful alignment between the MS1 and MS2 data streams. Such high speed throughput is not optimal for high resolution mass analysers.

SUMMARY OF THE INVENTION

The present invention seeks to address the shortcomings of existing DIA approaches. In accordance with a first aspect of the present invention, there is provided a method of data independent analysis (DIA) in accordance with claim 1. The invention also extends to a mass spectrometer in accordance with claim 15.

The present invention thus proposes a DIA technique in which high resolution identification and/or quantitation of the sample is carried out in the MS1 domain (i.e. with the precursor (unfragmented) ions. For example, an orbital trapping mass analyser (e.g. the Orbitrap® of Thermo Fisher Scientific, Inc.) having a resolution of 100,000 or more can be employed, to obtain an MS1 mass spectrum from which precursor ion species can be identified and quantified. As a result of the relatively high resolution used in the MS1 domain, it is possible to distinguish between two different sample molecules with low mass differences, for example an MS1 scan resolution of 120,00 is capable of distinguishing between peptides with c.a. 30 ppm (parts per million) mass difference. The orbital trapping mass analyser is also used to obtain MS2 spectra, at a lower resolution, to provide a secondary confirmation of preliminary identification based upon the analysis of MS1.

In the present disclosure, reference is made to resolutions of a mass analyser. All resolutions referenced in this disclosure will be understood by the skilled person to refer to a resolution of a mass analyser at a mass to charge ratio (m/z) equal to 200 amu (m/z=200 amu). The skilled person will understand that the m/z ratio at which the resolution of the mass analyser is specified is merely indicative of the resolution of the mass analyser at that m/z value, and is not tied to the m/z range over which the mass analyser is scanned according to the methodology of the present invention.

The method of the present invention is a data independent acquisition method of mass spectrometry for analysing a sample as it elutes from a chromatographic system. As such, the DIA method of the present invention is to be carried out over a time period based on a width of a chromatographic peak (i.e. the duration of a chromatographic peak) of a sample as it elutes from the chromatographic system. The method includes the step of ionising the sample to produce a plurality of precursor ions and the step of selecting a precursor mass range of interest for the sample to be analysed. The method also includes performing a plurality of MS1 scans, where each of the MS1 scans comprises: scanning precursor ions of the sample across the precursor mass range of interest, using a mass analyser operated at a first, relatively higher resolution, for identification and/or quantitation of the sample in the MS1 domain across the precursor mass range of interest. The method also includes performing a set of MS2 scans (and at most two sets of MS2 scans), where the set of MS2 scans comprises: segmenting the precursor mass range of interest into a plurality of precursor mass range segments, wherein for each precursor mass range segment the precursor ions are fragmented within that mass range segment, and performing an MS2 scan of the fragmented mass range segment with the mass analyser, operated at a second, relatively lower resolution, such that each of the fragmented sample segments across the precursor mass range of interest is fragmented and scanned in the MS2 domain. The method also provides that the MS1 scans are interleaved throughout the performing of the set of MS2 scans.

The plurality of MS1 scans of the precursor ions of the sample are performed across the mass range of interest, such that each MS1 scan is suitable for quantitation and/or identification of the sample in the MS1 domain across the entire mass range of interest. As such, it is understood that each of the MS1 scans extends across substantially all of the mass range of interest. The MS1 scans are performed using a mass analyser operated at a first, relatively higher resolution, for quantitation of the sample in the MS1 domain across the mass range of interest. As such, the relatively high resolution of the mass analyser is a resolution which is selected in order to reduce or minimise, and most preferably eliminate, interferences from matrix or other sample ions in the MS1 scan, thereby allowing identification and quantitation of the precursor sample ions in the MS1 domain. The relatively high resolution of the MS1 scans are performed at a resolution of at least 50,000 in order to sufficiently distinguish between precursor ions with similar masses, such that accurate quantitation and/or identification may be performed in the MS1 domain. The relatively high resolution of the MS1 scans are also defined relative to the resolution of the MS2 scans performed, which are described in more detail later.

The MS1 scans are performed a plurality of times, interleaved with the performance of each of the sets of MS2 scans. As such, the MS1 scans are repeated a number of times throughout the performance of a set of MS2 scans in order to repeatedly sample the precursor ions in the MS1 domain over the duration of the chromatographic peak. Thus, the MS1 scans provide a mass chromatogram of the sample as it elutes from the chromatographic system. Preferably the MS1 scans are performed at least 3 times, more preferably at least 5 times and most preferably at least 7 times over the duration of a chromatographic peak. By repeating the MS1 scan a number of times a more accurate quantitation of the precursor ions can be established. As such, the MS1 scans may be repeated in order to sample a sample of precursor ions a number of times, for example at a sampling rate. Where the sample elutes from an LC column (i.e. upstream of the ion source of the mass spectrometer), the aforementioned number of MS1 scans is preferably performed within a time period based on the width of an LC peak of the sample. For example, the time period may correspond to a time period equivalent to the width of an LC peak, preferably at its base, such as calculated from 4 standard deviations of the LC peak. The sampling rate of the MS1 scans may be predetermined, or the sampling rate may be varied in response to a change in the sample delivery, for example due to a detected change in elution profile from a LC column (for example a detected change in the standard deviation). The variable control of the MS1 scans is described in more detail below.

For performing each of the MS2 scans in a set of MS2 scans, the (precursor) mass range of interest is segmented into a plurality of (precursor) mass range segments using a mass selector such as a quadrupole mass filter. Other mass selectors than a quadrupole mass filter can be used, for example including mass selectors wherein isolation is performed in an ion trap or other device that is not a mass filter. The quadrupole mass filter filters (or other mass selector selects) the precursor sample ions based on a relatively small mass range segment compared to the precursor mass range of interest. By segmenting the precursor sample ions into relatively small mass range segments, the information obtained from the set of MS2 scans may be used to validate the quantitation/identification data from the MS1 scans. A set of MS2 scans is understood to mean performing a single MS2 scan for each of the relatively small mass range segments across the whole mass range of interest.

According to the method of the present invention, the MS1 scans are interleaved throughout the performance of the set of MS2 scans. By interleaving the MS1 scans with the MS2 scans in this way, the MS1 domain is sampled a plurality of times throughout the DIA method by the mass analyser in order to provide a more accurate quantitation of the precursor ions, whilst sampling all of the mass range segments in the set of MS2 scans only once. Advantageously, by interleaving the MS1 scans with the MS2 scans the sampling rate in the MS1 domain is increased relative to the sampling rate of the set of scans in the MS2 domain. The present inventors have realised that in a DIA method which utilises the MS2 domain for validation only, the sampling rate of the sets of scans in the MS2 domain may be reduced relative to the sampling rate in the MS1 domain. In particular, the present inventors have developed a DIA method whereby at most two sets of MS2 scans are performed over the duration of a chromatographic peak. The present inventors have realised that by performing high resolution MS1 scans (>60,000 resolution) for quantitation/identification of the sample, it is not necessary to perform regular sampling of the MS2 domain across the chromatographic peak, as the MS2 data is used for validation of the MS1 data. As such, the present inventors have developed a DIA methodology whereby it is not necessary to obtain a mass chromatogram in the MS2 domain, and so the number of sets of MS2 scans may be significantly reduced. Thus, by performing at most two sets of MS2 scans across a chromatographic peak, the time available for performing each MS2 scan within a set is increased. As such the quality of the set of scans in the MS2 domain may be optimised (improved), for example the mass ranges of the mass range segments for the set of MS2 scan may be reduced and/or the resolution increased. Alternatively, the total time taken for performing the DIA method according to the present invention may be reduced. Performing two sets of MS2 scans across the chromatographic peak may improve the signal to noise ratio, however, the method may also be performed with only one set of MS2 scans. By performing only a single set of MS2 scans, the amount of time available for performing the set of MS2 scans is doubled (relative to performing two sets of MS2 scans). Alternatively, by reducing the number of sets of MS2 scans to be performed, more time over the duration of the chromatographic peak can be devoted to performing MS1 scans. Thus, the number of MS1 scans performed may be increased, or the resolution of each MS1 scan may be increased. As such, the DIA methodology according to the present invention provides improvements in both the MS1 and MS2 domains compared to prior art methods.

The step of step of selecting a precursor mass range of interest for the sample to be analysed may include one or more of selecting a lower limit for the precursor mass range, selecting an upper limit for the precursor mass range or selecting a mass window width for the precursor mass range. The controller may control a mass selector (mass filter) to filter ions not within the mass range of interest during the MS1 scan. By filtering ions not within the mass range of interest, the accuracy of the MS1 scan may be improved.

The precursor mass range of interest may be based on an m/z ratio. A lower limit for the precursor mass range may be defined by an m/z ratio of greater than 0, or more preferably at least 10, or at least 20, or at least 50. Preferably, the lower limit may be an m/z ratio of at least 100, or at least 200 or at least 300 and most preferably an m/z ratio of at least 400. An upper limit for the precursor mass range may be defined by an m/z ratio of no greater than 4000. Preferably, the upper limit for the precursor mass range may be defined by an m/z ratio of no greater than 2000, or no greater than 1600 or more preferably no greater than 1200. By limiting the mass range to be analysed in the MS1 scans to a mass range of interest, a relatively high resolution scan can be performed over the mass range of interest for a given duty cycle time duration. Alternatively, the skilled person will appreciate a mass range of interest can be defined by a mass window width and one of an upper mass limit or a lower mass limit. A mass window width may be defined by an m/z ratio range of at least 100, or more preferably at least 500, or at least 750, or at least 1000, or at least 2000, or at least 4000. Accordingly different mass ranges of interest may be analysed by the data independent acquisition method according to the present invention. By reducing the selected mass range of interest, the total time taken to complete the DIA method may be reduced. Accordingly, it is advantageous for the operator to be able to specify/select a mass range of interest for the method in prior to the scanning steps.

According to a selected mass range of interest, MS1 scans of the precursor ions of the sample are performed across the mass range of interest. The MS1 scans are performed using a mass analyser operated at a first, relatively higher resolution, for quantitation of the sample in the MS1 domain across the mass range of interest. The relatively high resolution used for the MS1 scan is a resolution of at least 50,000 and more preferably at least 60,000, or at least 75,000, or at least 100,000, or at least 120,000 (examples of high resolutions achievable in an orbital trapping mass analyser, such as an Orbitrap™ mass analyser from Thermo Fisher Scientific, being 120,000 or 240,000). By using a resolution of at least 50,000 for the MS1 scans the precursor ions may be suitably quantitated in the MS1 domain whilst minimising interferences from other precursor ions or matrix ions in the MS1 scan.

Preferably, the mass analyser used to perform the scans is an orbital trapping mass analyser. Advantageously, by using an orbital trapping mass analyser MS1 scans may be performed with a relatively high resolution and a set of MS2 scans may be performed with a relatively low resolution, whilst using a relatively compact mass analyser. Preferably the orbital trapping analyser is used to perform MS1 scans with a resolution of at least 50,000 in order to provide improved quantitation of precursor ions in the MS1 domain. For example, a relatively high resolution for the orbital mass trapping analyser according to the present invention may be at least 100,000, and a relatively low resolution (for the MS2 scans) may be less than 60,000, or less than 50,000, or less than 40,000, more preferably less than 30,000. In some embodiments, resolutions for the MS2 scans of less than 20,000, or less than 15,000, or less than 10,000 (e.g. 7,500) may be sufficient, thereby enabling narrower mass range segments to be used, which assists in validating the identification/quantitation of the precursor ions. Accordingly, an orbital trapping mass analyser may be used in the present method to optimise the resolution of the MS1 scan to quantitate the precursor ions, while the resolution of the MS2 scans are optimised to validate the quantitation of the precursor ions. Although an orbital trapping mass analyser may preferably be used to provide the relatively high resolution of at least 100,000, the skilled will appreciate that other mass analysers with a resolution of at least 100,000 would also be suitable. For example, a multi-reflection time-of-flight mass spectrometer or a Fourier transform Ion Cyclotron Resonance (FT-ICR) mass spectrometer can be used. The high mass accuracy of the orbital trapping mass analyser or FT-ICR mass analyser enables high reliability of identification of samples from the MS1 scans, with the MS2 scans providing confirmation of identification. More preferably, a mass analyser (e.g. an orbital trapping mass analyser) may be used to perform MS1 scans with a relatively high resolution of at least 120,000, or at least 130,000, or at least 140,000 or at least 150,000. By increasing the resolution of the MS1 scans, the ability to distinguish between a various sample ions and matrix ions is improved, thereby improving the accuracy of the sample quantitation.

The set(s) of MS2 scans are performed at a relatively lower resolution than the resolution used for the MS1 scans. Preferably, the resolution of the mass analyser in the MS2 domain is less than half of the resolution of the mass analyser in the MS1 domain. More preferably, the resolution of the mass analyser in the MS2 domain is less than 40%, or less than 30%, or less than 25%, or in some embodiments about 25%, or less than 10% of the resolution of the mass analyser in the MS 1 domain. As quantitation is performed in the MS1 domain, the resolution of scans in the MS2 domain may be reduced without affecting the quantitation accuracy.

Preferably, the resolution of the MS2 scans is at least 2,500 or at least 5,000. The MS2 scans may be performed above a minimum resolution in order to ensure that the fragment ions can be detected sufficiently accurately. Preferably the resolution of the MS2 scans is no greater than 75,000. Increasing the resolution above this limit increases the time required to perform the MS2 scans which is undesirable. Furthermore, as the MS2 data is only required to validate the MS1 quantitation, it is not required to perform relatively high resolution scans in the MS2 domain. Rather, the present invention seeks to optimise the DIA method by sampling the precursor ions in the MS1 domain (with relatively high resolution scans) at a sampling rate which is higher than the sampling rate for performing a set of MS2 scans (at a relatively lower resolution) of the mass range segments.

Each mass range segment produced by the mass selector is fragmented in order to produce a plurality of fragmented ions for each of the MS2 scans. The fragmentation may be performed using a fragmentation cell or chamber. The fragmentation of the precursor ions can be effected using any known methods of fragmenting ions, for example Collision-induced dissociation (CID), Electron transfer dissociation (ETD), Electron capture dissociation (ECD), Photo induced dissociation (PID) or Surface induced dissociation (SID). The fragmented ions are subsequently supplied to the mass analyser for MS2 scanning.

Preferably the range of masses in each mass range segment is no greater than 10 Da, and more preferably no greater than 7 Da. By restricting the mass range of each segment, the accuracy of the MS2 validation step is improved. This is because the potential mass range of the precursor ions used to generate the fragments for the MS2 scans is reduced. Thus, a more accurate validation about the precursor ions can be performed based on the knowledge of the reduced precursor mass range used to generate the fragmented ions for each of the MS2 scans. For example, by utilising a range of masses for each mass range segment of no greater than 10 Da, a data dependent acquisition (DDA) spectral library may be used as part of the MS2 validation process, thus reducing the requirements for processing of the MS2 domain data.

Preferably, a lower limit for the mass range of each mass range segment is at least 1 Da, more preferably 2 Da, and most preferably 4 Da. Reducing the mass range of each mass range segment below said lower limit results in performing an excessively large number of MS2 scans over the mass range of interest. Accordingly, the resulting resolution and sensitivity of the MS2 scans at such a mass range results in poor validation in the MS2 domain.

Preferably, the resolution of each of the MS2 scans in the set of MS2 scans may be variable. The resolution of each of the MS2 scans may be dynamically modified (varied "on the fly") based on the data in a previous MS1 scan performed as part of the DIA method. A previous MS1 scans may be any MS1 scan performed as part of the DIA method prior to the MS2 scan to be performed. As such, a previous MS1 scan may be the first (initial) MS1 scan performed as part of the DIA method. Preferably, the previous MS1 scan is the immediately previous MS1 scan performed (most recently performed MS1 scan) according to the interleaving of the MS1 scans with the MS2 scans.

Preferably, the resolution of each of the MS2 scans is varied (dynamically modified) based on the sample quantitation (e.g. from precursor ion peak height in MS1 domain) in a previous/immediately previous/initial MS1 scan. For example, in some samples (e.g. tryptic digested protein samples), a low m/z range has a higher ion density than the high m/z range. In a high density ion region, enough ions can be collected for identification purpose using a relatively short duration, low resolution scan. In this case, the controller may automatically adjust the resolution of the MS2 scans to a relatively low resolution setting to achieve the fastest speed. In contrast, in the low ion density m/z region, the controller may adjust the resolution of the MS2 scan to a relatively higher resolution. A relatively longer ion injection time for the MS2 scan may also be applied by the controller in this case. In this manner, the signal to noise ratio of the MS2 scans may be improved, therefore improving the identification rate for the low abundance ions.

The resolution of each of the MS2 scans in the set of MS2 scans may also vary depending on the mass range of the mass range segment being scanned. The resolution of the MS2 scan for a given mass range may be set according to pre-determined values stored in the controller or set in advance of the analysis by a user defined input or data file.

It will be appreciated that the MS2 scans of the mass range segments need not be performed sequentially (e.g. in mass order) but they could be performed non-sequentially.

Preferably the time period for performing the DIA method of the present invention is the same as the width (duration) of the chromatographic peak. For example, width (duration) of the chromatographic peak may be calculated according to a number of standard deviations of the peak (preferably 2, or 4). Alternatively, the peak width may be calculated based on the width at half the maximum height. By accurately determining the width (duration) of the chromatographic peak, the MS1 scans may be sampled across the duration of the peak such that the accuracy of the mass chromatogram is improved, thereby improving the accuracy of the sample quantitation.

Preferably, the MS1 scans are performed at regular intervals over the duration of the chromatographic peak, thereby improving the accuracy of the mass chromatogram of the sample.

Preferably, at least 7 MS1 scans and two sets of MS2 scans are performed in the DIA method according to the present invention. Thus, when a specified time period for performing the DIA method is based on a width (duration) of a chromatographic peak of the sample, the chromatographic peak is sampled at least 7 times in the MS1 domain. Furthermore, two sets of MS2 scans are performed across the width (duration) of the chromatographic peak. By performing two sets of MS2 scans, the accuracy of the MS2 validation may be improved, as a greater proportion of the mass range segments of the set of MS2 scans may be performed in the central portion of the peak but without duplicating large amounts of MS2 measurements which are not required for sample validation (in the MS2 domain).

Thus, in contrast to the prior art, in embodiments of the present invention, the MS1 scan repetition rate is set independently of the sampling rate for the set of MS2 scans, so that a sufficient number of data points from the MS1 domain are acquired, over a chromatographic peak, to allow accurate determination of peak areas (quantitation). The overall MS2 cycle length is maximized, in embodiments of the present invention, but with the condition that each precursor ion must be sampled for MS2 at least once (for example once or at most twice) within the duration of a typical chromatographic peak.

This results in relatively narrow (e.g. 10 Da) precursor isolation windows. With narrow precursor isolation windows, the number of different ion species within each window is reduced to a point where conventional DDA data analysis can be carried out without the need to generate large, multiple precursor ion database libraries.

In general terms, the present invention is based on the realisation that a coverage of the same precursor ions with large numbers of sets of MS2 scans (e.g. >5) does not make best use of the available scanning time of a chromatographic peak. As such, in the DIA method of the present invention, the number and resolution of the MS1 scans are optimised in order to perform a sufficient number of MS1 scans at a sufficient resolution over the duration of a chromatographic peak for the quantitation of a sample in the MS1 domain. Furthermore, the number of sets of MS2 scans performed is optimised to perform a sufficient number of sets of MS2 scans over the duration of a chromatographic peak for validation of the MS1 data (without any unnecessary duplication of data in the MS2 domain).

The mass window width (mass range of the mass range segment) for each MS2 scan may be the same or it may be variable. For example, for regions of the mass range of interest where the precursor peak density is low, for example as determined from the MS1 scans (a previous/initial/immediately previous MS1 scan), a wider window width can be used for the MS2 mass range segments compared to regions of the mass range where the peak density is higher. In some embodiments therefore, the widths of the mass range segments used for the MS2 scans can be dynamically selected based on a previous MS1 scan and/or can depend on the mass (m/z).

A time saving associated with the techniques of the present invention can be employed for longer ion injection and higher resolution, which in turn provides benefits in terms of fidelity in the MS2 domain.

Advantages of aspects of the present invention thus include better quantitation precision (due to the use of MS1 rather than MS2); the ability to use already established DDA library databases; and improved MS2 data quality in MS2 through a maximization of the ion injection and detection time.

The controller may be operated according to a computer program comprising instructions to cause the mass spectrometer to execute the steps of the method according to the present invention. Therefore, in another aspect, the invention provides a computer program comprising instructions to cause the mass spectrometer described above to execute the steps of the method according to the invention. In still another aspect the invention provides a computer-readable medium having stored thereon the computer program.

It will be appreciated that the mass spectrometer of the present invention will typically comprise other components. For example, the mass spectrometer will generally comprise an ionization source to ionise the sample molecules and produce the precursor ions for mass analysis. This may be an electrospray ionization source (ESI source) or another atmospheric pressure ionization source for example.

BRIEF DESCRIPTION OF THE DRAWINGS

The invention may be put into practice in a number of ways and a specific embodiment will now be described by way of example only and with reference to the Figures in which.

DETAILED DESCRIPTION OF PREFERRED EMBODIMENTS

Herein the term mass may be used to refer to the mass-to-charge ratio, m/z.

Figure 1:
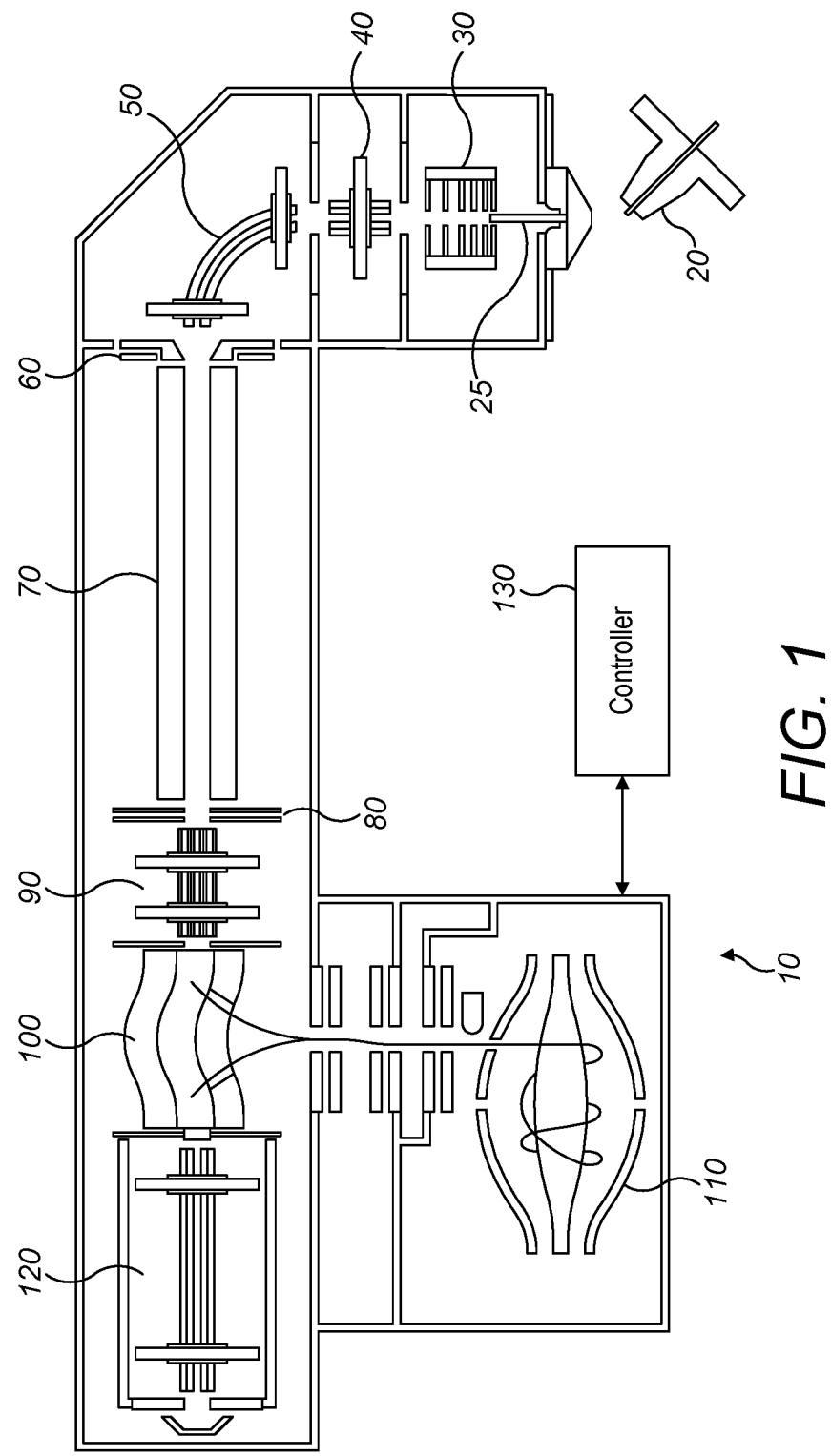
FIG. 1 shows a schematic arrangement of a mass spectrometer suitable for carrying out methods in accordance with embodiments of the present invention.

FIG. 1 shows a schematic arrangement of a mass spectrometer 10 suitable for carrying out methods in accordance with embodiments of the present invention. The arrangement of FIG. 1 represents, schematically, the configuration of the Q-Exactive® mass spectrometer from Thermo Fisher Scientific, Inc.

In FIG. 1, a sample to be analysed is supplied (for example from an autosampler) to a chromatographic apparatus such as a liquid chromatography (LC) column (not shown in FIG. 1). One such example of an LC column is the Thermo Fisher Scientific, Inc ProSwift monolithic column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase.

A chromatograph may be produced by measuring over time the quantity of sample molecules which elute from the HPLC column using a detector (for example a mass spectrometer). Sample molecules which elute from the HPLC column will be detected as a peak above a baseline measurement on the chromatograph. Where different sample molecules have different elution rates, a plurality of peaks on the chromatograph may be detected. Preferably, individual sample peaks are separated in time from other peaks in the chromatogram such that different sample molecules do not interfere with each other.

On a chromatograph, a presence of a chromatographic peak corresponds to a time period over which the sample molecules are present at the detector. As such, a width of a chromatographic peak is equivalent to a time period over which the sample molecules are present at a detector. Preferably, a chromatographic peak has a Gaussian shaped profile, or can be assumed to have a Gaussian shaped profile. Accordingly, a width of the chromatographic peak can be determined based on a number of standard deviations calculated from the peak. For example, a peak width may be calculated based on 4 standard deviations of a chromatographic peak. Alternatively, a peak width may be calculated based on the width at half the maximum height of the peak. Other methods for determining the peak width known in the art may also be suitable. As such, the MS1 data acquired according to the DIA method of the invention thus provides a mass-chromatogram of the sample eluted from the column.

The sample molecules thus separated via liquid chromatography are then ionized using an electrospray ionization source (ESI source) 20 which is at atmospheric pressure. Sample ions then enter a vacuum chamber of the mass spectrometer 10 and are directed by a capillary 25 into an RF-only S lens 30. The ions are focused by the S lens 30 into an injection flatapole 40 which injects the ions into a bent flatpole 50 with an axial field. The bent flatapole 50 guides (charged) ions along a curved path through it whilst unwanted neutral molecules such as entrained solvent molecules are not guided along the curved path and are lost.

An ion gate (TK lens) 60 is located at the distal end of the bent flatapole 50 and controls the passage of the ions from the bent flatapole 50 into a downstream quadrupole mass filter 70. The quadrupole mass filter 70 is typically but not necessarily segmented and serves as a band pass filter, allowing passage of a selected mass number or limited mass range whilst excluding ions of other mass to charge ratios (m/z).

Ions then pass through a quadrupole exit lens/split lens arrangement 80 and into a transfer multipole 90. The transfer multipole 90 guides the mass filtered ions from the quadrupole mass filter 70 into a curved trap (C-trap) 100. The C-trap 100 has longitudinally extending, curved electrodes which are supplied with RF voltages and end caps that to which DC voltages are supplied. The result is a potential well that extends along the curved longitudinal axis of the C-trap 100. In a first mode of operation, the DC end cap voltages are set on the C-trap so that ions arriving from the transfer multipole 90 are captured in the potential well of the C-trap 100, where they are cooled. The injection time (IT) of the ions into the C-trap determines the number of ions (ion population) that is subsequently ejected from the C-trap into the mass analyser.

Cooled ions reside in a cloud towards the bottom of the potential well and are then ejected orthogonally from the C-trap 100 towards an orbital trapping device 110 such as the Orbitrap® mass analyser sold by Thermo Fisher Scientific, Inc. The orbital trapping device 110 has an off centre injection aperture and the ions are injected into the orbital trapping device 110 as coherent packets, through the off centre injection aperture. Ions are then trapped within the orbital trapping device 110 by a hyperlogarithmic electric field, and undergo back and forth motion in a longitudinal direction whilst orbiting around the inner electrode.

The axial (z) component of the movement of the ion packets in the orbital trapping device 110 is (more or less) defined as simple harmonic motion, with the angular frequency in the z direction being related to the square root of the mass to charge ratio of a given ion species. Thus, over time, ions separate in accordance with their mass to charge ratio.

Ions in the orbital trapping device 110 are detected by use of an image detector (not shown in FIG. 1) which produces a "transient" in the time domain containing information on all of the ion species as they pass the image detector. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the sample ions (more specifically, a subset of the sample ions within a mass range of interest, selected by the quadrupole mass filter) are analysed by the orbital trapping device 110 without fragmentation. The resulting mass spectrum is denoted MS1.

MS/MS (or, more generally, MSn) can also be carried out by the mass spectrometer 10 of FIG. 1. To achieve this, precursor sample ions are generated and transported to the quadrupole mass filter 70 where a subsidiary mass range is selected. The ions that leave the quadrupole mass filter 70 are again cooled in the C trap 100 but are then ejected in an axial direction towards a fragmentation chamber or cell 120. The fragmentation chamber 120 is, in the mass spectrometer 10 of FIG. 1, a higher energy collisional dissociation (HCD) device to which a collision gas is supplied. Precursor ions arriving into the fragmentation chamber 120 are bombarded with high energy collision gas molecules resulting in fragmentation of the precursor ions into fragment ions. The fragment ions are then ejected from the fragmentation chamber 120 back towards the C-trap 100, where they are once again trapped and cooled in the potential well. Finally the fragment ions trapped in the C-trap are ejected orthogonally towards the orbital trapping device 110 for analysis and detection. The resulting mass spectrum of the fragment ions is denoted MS2.

Although an HCD fragmentation chamber 120 is shown in FIG. 1, other fragmentation devices may be employed instead, employing such methods as collision induced dissociation (CID), electron capture dissociation (ECD), electron transfer dissociation (ETD), photodissociation, and so forth.

The "dead end" configuration of the fragmentation chamber 120 in FIG. 1, wherein precursor ions are ejected axially from the C-trap 100 in a first direction towards the fragmentation chamber 120, and the resulting fragment ions are returned back to the C-trap 100 in the opposite direction, is described in further detail in WO-A-2006/103412.

The mass spectrometer 10 is under the control of a controller 130 which, for example, is configured to control the timing of ejection of the trapping components, to set the appropriate potentials on the electrodes of the quadrupole etc so as to focus and filter the ions, to capture the mass spectral data from the orbital trapping device 110, control the sequence of MS1 and MS2 scans and so forth. It will be appreciated that the controller may comprises a computer that may be operated according to a computer program comprising instructions to cause the mass spectrometer to execute the steps of the method according to the present invention.

It is to be understood that the specific arrangement of components shown in FIG. 1 is not essential to the methods subsequently described. Indeed other arrangements for carrying out the DIA methods of embodiments of the present invention are suitable.

An exemplary embodiment of the method will now be described with reference to FIGS. 2 and 3, in which sample ions are supplied from a liquid chromatography (LC) column as part of the exemplary apparatus described above (as shown in FIG. 1).

In the exemplary embodiment of the invention, the sample ions are supplied from the LC column such that the data independent acquisition method according to embodiments of the present invention acquires data about the sample ions over a duration corresponding to a chromatographic peak of the sample supplied from the LC column. As such, the controller is configured to perform the method within a time period corresponding to the width (duration) of the chromatographic peak at its base.

Figure 2:
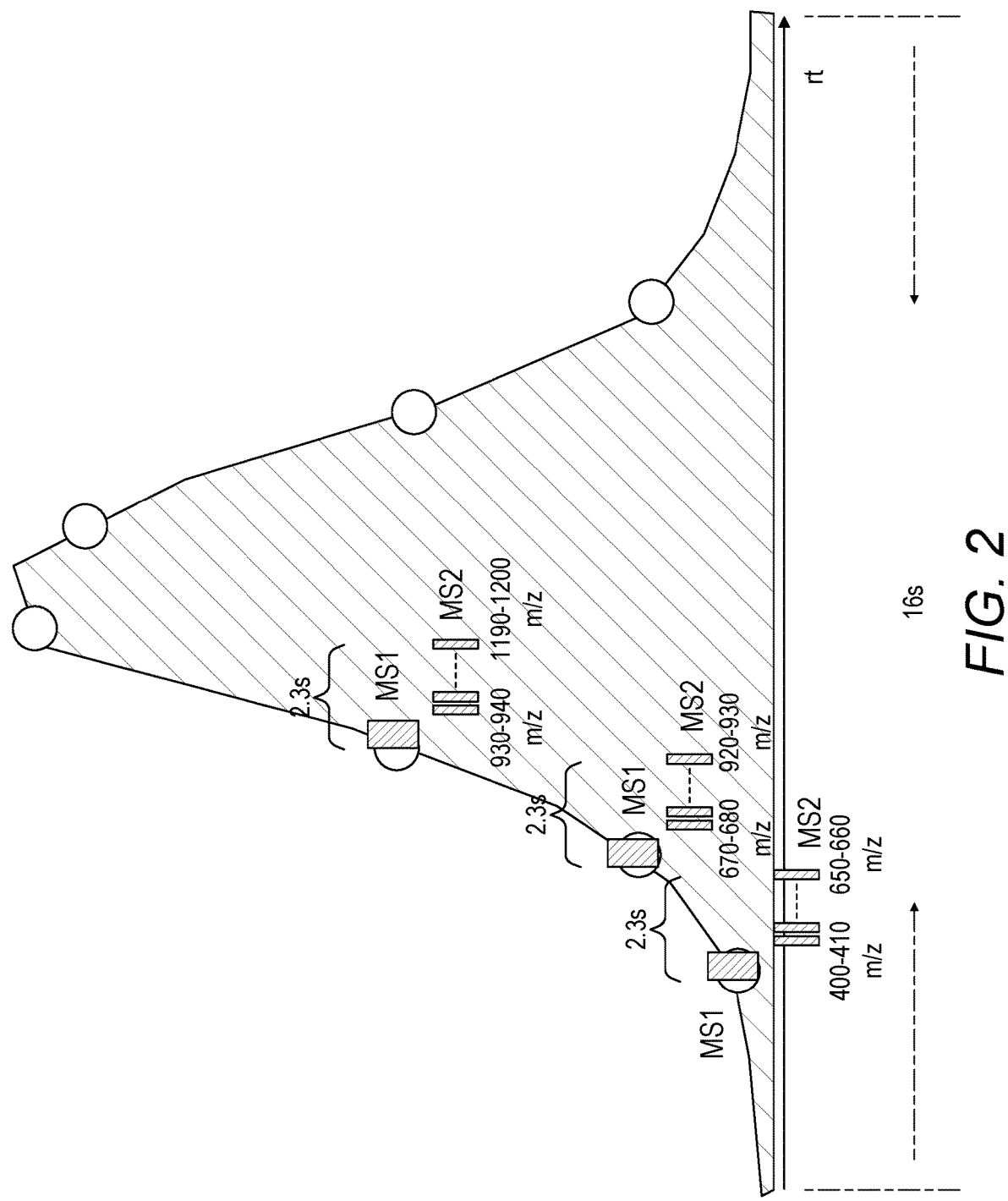
FIG. 2 shows an example of the DIA methodology according to an embodiment of the present invention superimposed onto the characteristics of a chromatographic peak produced by liquid chromatography.

As shown in FIG. 2, a chromatographic peak produced by a LC column has a duration of 16 seconds based a width of the peak calculated according to 4 standard deviations of an ideal Gaussian curve fitted to the peak shown in FIG. 2.

As shown in FIG. 2, a plurality of MS1 scans and two sets of MS2 scans are performed in the course of the DIA methodology (workflow). MS1 scans may be performed using the apparatus shown in FIG. 1 (or other suitable apparatus).

In order to perform a single MS1 scan, sample molecules from an LC column are ionized using the ESI source 20. Sample ions subsequently enter the vacuum chamber of the mass spectrometer 10. The sample ions are directed by through capiliary 25, RF-only lens 30, injection flatapole 40, bent flatapole 50 and into the quadrupole mass filter 70 in the manner as described above. The quadrupole mass filter 70 is controlled by the controller 130 to filter the sample ions according to the selected precursor mass range of interest. A wide m/z range or window, e.g. >500 m/z units, such as a window 400-1200 m/z, is selected by the mass filter 70.

Ions then pass through the quadrupole exit lens/split lens arrangement 80, through the transfer multipole 90 and into the C-trap 100. From the C-trap 100, (precursor) sample ions may be injected in to the orbital trapping mass analyser 110. Once ions are stabilised inside the orbital trapping mass analyser, the MS1 scan is performed by using the image current detector to detect the ions present in the orbital trapping mass analyser 110. The detection of the ions in the orbital trapping mass analyser is configured to be performed with a relatively high resolution for the MS1 scan (relative to the resolution of the MS2 scans).

In order to perform a single MS2 scan of a mass range segment, sample molecules from an LC column are ionized and injected into the mass spectrometer in a similar manner to the MS1 scan. The sample ions for the MS2 scan progress through the capiliary 25, RF-only lens 30, injection flatapole 40, bent flatapole 50 and into the quadrupole mass filter 70 in a similar manner to the sample ions for the MS1 scan.

Once the sample ions for the MS2 scan reach the quadrupole mass filter 70, the quadrupole mass filter 70 is controlled by the controller to filter the sample ions according to the relatively narrow mass range of the mass range segment being scanned (relative to the precursor mass range of interest).

The (filtered mass segment) precursor ions pass from the quadrupole mass filter 70 through to the C-trap 100 as described above for the MS1 scan. The controller then directs the C-trap to eject the precursor ions in an axial direction towards the fragmentation chamber 120.

In the HCD fragmentation chamber 120, the precursor ions collide with high energy collision gas molecules which results in the fragmentation of the precursor ions into fragment ions. The fragment ions are then ejected from the fragmentation chamber 120 back into the C-trap where they are trapped and cooled. The fragment ions are then ejected into the orbital trapping mass analyser 110 which is operated at a relatively lower resolution for analysis (MS2 scan). The resulting acquisition of a mass spectrum is denoted an MS2 scan.

According to the exemplary embodiment, the controller 130 controls the mass spectrometer 10 to perform the plurality of MS1 scans over the mass range of interest, and also the set of MS2 scans.

The timing of the various stages of ionization, filtering, trapping, ejection, fragmentation (for MS2) and analysis, for each MS1 and MS2 scan, may be controlled by the controller 130 so as to optimise throughput. For example, it is possible to analyse precursor ions in the orbital trapping mass analyser 110 in order to obtain an MS1 scan, whilst a subrange of the precursor ions is being trapped in the C-trap 100 for subsequent fragmentation in the fragmentation chamber 120, or is already in the fragmentation chamber 120 for fragmentation there. Alternatively, the fragment ions may be cooled and trapped in the C-trap 100 whilst analysis of the precursor ions is being carried out in the orbital trapping mass analyser 110, so that the fragment ions can be injected into the orbital trapping mass analyser 110 for obtaining an MS2 scan, as soon as the precursor ion analysis has been completed.

The MS1 scans may be repeated over the duration of the chromatographic peak in order to sample the peak a number of times over its duration. Preferably the peak is sampled at least 3 times, 5 times or optimally 7 times as shown in FIG. 2. Advantageously, by sampling the peak a number of times in the MS1 domain, the number of data points over the peak is increased thereby improving the detection of sample precursor ions in the chromatographic peak. By sampling the peak a plurality of times, it may be ensured that the precursor ion or each of the precursor ions in the sample peak is detected in a plurality of the MS1 scans leading to better quantitation precision.

As shown in FIG. 2, 7 MS1 scans are performed across the duration of the sample peak in order to have a good peak shape for the MS1 quantitation. As such, the MS1 scans are to be repeated at intervals of approximately 16/7≈2.3 seconds (an MS1 sampling rate of ~0.43 Hz). The resolution for the MS1 scans is set to 120,000 across a mass range of interest of 400-1,200 m/z. Accordingly, a single MS1 scan has a duration of approximately 0.3 seconds, such that the total duration for performing the MS1 scans is approximately 2.1.

In contrast, it is not required to have a meaningful chromatographic peak for the MS2 data, and so only two sets of MS2 scans are to be performed across the duration of the chromatographic peak. Thus, the required duration for performing a set of MS2 scans is set to be approximately 6 seconds. As shown in FIG. 2, the performance of the MS1 scans are interleaved throughout the performance of the MS2 scans. In the example shown in FIG. 2, the mass range of interest is selected to be 400-1200 m/z, and the mass range for each of the segments is selected to be 10 Da.

Therefore, 80 MS2 scans need to be performed in a single set of MS2 scans. If the time for performing a set of MS2 scans is spread evenly into each MS2 scan, each MS2 scan may have a duration of ~75 ms. The resulting resolution of the MS2 scans is determined based on the available duration for each scan. For example, in FIG. 2 the methodology uses a Q Exactive® HF apparatus as described above and so each MS2 scan may be acquired in the specified duration at a resolution of 30,000. Accordingly, a single set of MS2 scans interleaved with a plurality of MS1 scans at the required MS1 sampling rate can be performed within 6.9 seconds as shown. Therefore, the two sets of MS2 scans are optimised to be performed at the highest resolution possible for the specified mass range segments within the specified chromatographic peak duration whilst still ensuring that the MS1 domain is sampled at regular intervals throughout the chromatographic peak.

Figure 3:
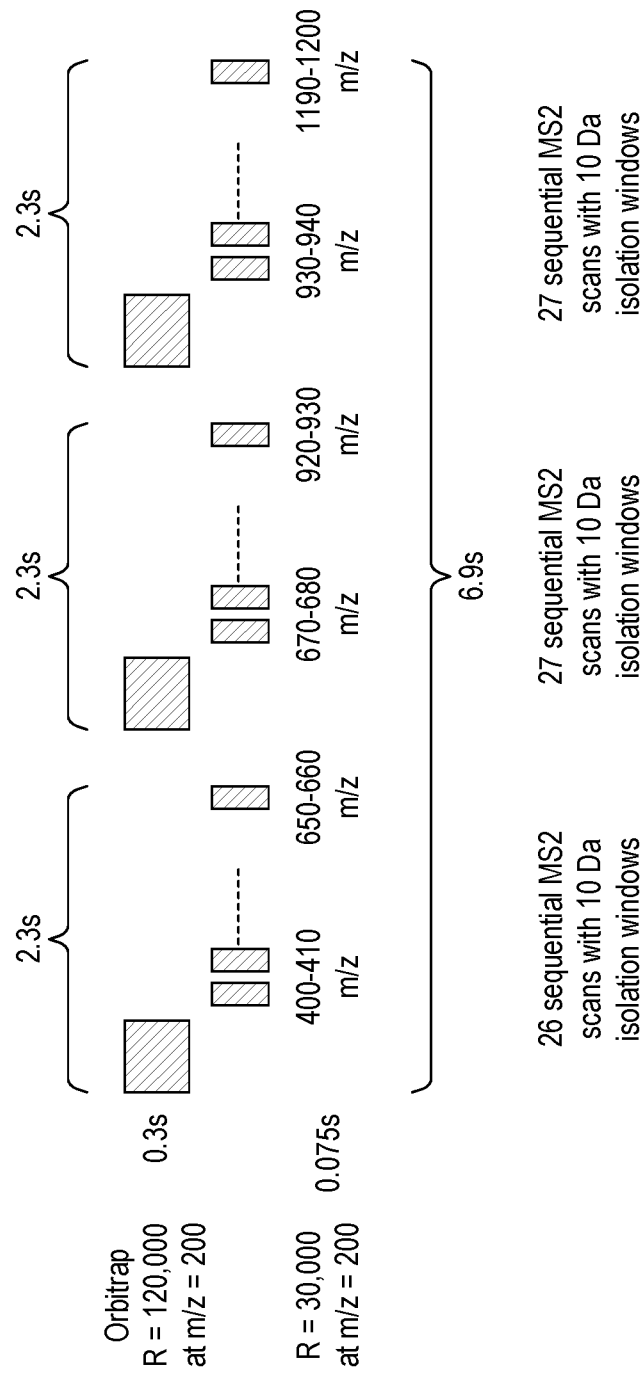
FIG. 3 shows a timing diagram representative of the interleaving of MS1 and MS2 scans according to an embodiment of the present invention.

FIG. 3 shows a time series diagram for the performance of a single set of MS2 scans according to the methodology discussed with reference to FIG. 2. As discussed, the MS1 scans are interleaved every 2.3 s between the MS2 scans, and the total time for performing a set of MS2 scans interleaved with the MS1 scans is 6.9 s. It can be seen that 26 to 27 MS2 scans are sampled between the MS1 scans. This means the entire sequence in order to acquire a set of MS2 scans is: MS1 (400-1200 m/z), MS2 (400-410 m/z), MS2 (410-420 m/z) . . . MS2 (650-660 m/z), MS1 (400-1200 m/z), MS2 (670-680) . . . MS2 (920-930), MS1 (400-1200 m/z), MS2 (930-940) . . . MS2 (1190-1200).

Accordingly, the method of the preferred embodiment provides a series of MS1 scans with a high resolving power (120,000) such that the MS1 scans may be used for quantitation of the precursor ions. The high mass accuracy contributed to the uniqueness of the precursor identifications. The MS2 scans of the fragmented precursor ions are used for validation. A relatively large amount of time resolution is not required in the MS2 domain due to the high resolution quantitation performed in the MS1 domain, and therefore the MS2 scan may be optimised for only validation of the identity of the precursor ion. This approach allows for a data independent acquisition method of mass spectrometry which has improved sensitivity and selectivity. Furthermore, quantitation of precursor ions may be performed in the MS1 domain using a "library free" approach, thus reducing the requirements on post-processing of the acquired data.

One method for analysing DIA MS1 scan data and quantitating precursor ions using a library free approach is described in "DIA-Umpire: comprehensive computational framework for data independent acquisition proteomics", Tsou et al, Nat Methods, March 2015 p 258-264.

Preferably, the exemplary embodiment may be further modified to adjust the MS2 scans using dynamic control (online adjustment). The resolution and ion injection time for each the MS2 scans may be modified "on the fly" based on, for example, the ion populations in the previous MS1 scan, a predefined duty cycle time and/or liquid chromatography column information.

Preferably, for a specified time period for performing the method (for example based on the width of a chromatographic peak), the ion injection times and the detection times for each of the MS2 scans may be maximised within the time period. Maximising the ion injection times and the detection times has direct advantages in data quality in that the signal to noise ratio is improved. However, for some MS2 scans, for example mass range segments with relatively high ion densities as discussed above, an acceptable signal to noise ratio may be obtained using shorter duration scans. As such, the MS2 scans may be dynamically controlled in order to improve the signal to noise ratio by increasing the scan duration (ion injection time and/or detection time) for some MS2 scans and reducing the scan duration for other MS2 scans.

Preferably, for a typical tryptic protein sample, relatively low mass range segments may have a higher ion density that the relatively high mass range segments. Therefore, a relatively short ion injection time (for example 10 milliseconds) may be used for relatively low mass range segments, as enough ions can be collected in this time for identification purposes due to the relatively high ion density in these m/z regions. In this case, the controller can automatically adjust the injection time to reduce the ion injection time in order to improve the speed of the scan. The controller may also reduce the resolution to a relatively lower resolution setting (less transient time) in order to further improve the MS2 scan speed. For example, the controller may reduce the injection time from a normal MS2 value of 55 ms to 10 ms and the resolution from a normal MS2 value of 30,000 to 7,500 in response to the measured and/or expected ion density. In a relatively low density ion injection region, a longer injection time may be applied and/or at a higher resolution. By increasing the injection time and/or the resolution, the signal to noise ratio for the low density ion regions is improved. For example, the controller may increase the injection time from a normal value of 55 ms to 119 ms and the resolution may be increased from a normal value of 30,000 to 60,000. By dynamically modifying the MS2 scan parameters the signal to noise ratio of the MS2 scans may be improved without increasing the total time required to perform a single set of MS2 scans. It will be appreciated that the normal values for MS2 settings given as examples above may vary depending on the optimisation of the MS2 scans to fit the specified mass ranges as discussed elsewhere in this application.

A range of different resolution settings and injection time settings that the controller may use to dynamically modify is set out in Table 1 below.

TABLE 1

| Resolution | Detection Time | Maximal Injection Time | Scan time | Ion injection time dependent resolution |
| --- | --- | --- | --- | --- |
| 7.5k | 16 ms | 10 ms | 25 ms | IT ≤ 16 ms |
| 15k | 32 ms | 20 ms | 45 ms | 16 ms ≤ IT ≤ 50 ms |
| 30k | 64 ms | 55 ms | 75 ms | 51 ms ≤ IT ≤ 115 ms |
| 60k | 128 ms | 119 ms | 145 ms | 115 ms ≤ IT ≤ 120 ms |
| 120k | 256 ms | 245 ms | 270 ms | |

Table 1 shows an exemplary range of different resolution settings, where for each resolution setting, the corresponding maximal injection time, detection time, scan time and ion injection time are shown. Also for the optimisation of the MS2 scan speed, the ion injection time may be calculated based on the MS1 data, with the resulting calculated ion injection time determining the resolution to be applied to the MS2 scan according to the ranges specified in Table 1. As such, for a calculated ion injection time of 20 ms, an MS2 scan resolution of 15,000 would be applied.

It can be appreciated that the ion injection time ranges and corresponding resolution settings are merely exemplary, and that the number of different resolution settings and corresponding ion injection time ranges may be varied. Preferably, there are at least 3 different resolution settings, and more preferably at least 4 different resolution settings for the MS2 scans. The resolution settings may range from at least 5,000 up to 200,000. Preferably, the resolution settings may include at least one of 5,000, 7,500, 10,000, 12,500, 15,000, 17,500, 20,000, 25,000, 30,000, 35,000, 40,000, 45,000, 50,000, 60,000, 70,000 and 80,000. The ion injection time ranges for each of the resolution settings may be in a range from greater than 1 ms to no greater than 150 ms. The time intervals across the time range may be based on a time taken to perform a scan at the specified resolution.

Figure 4:
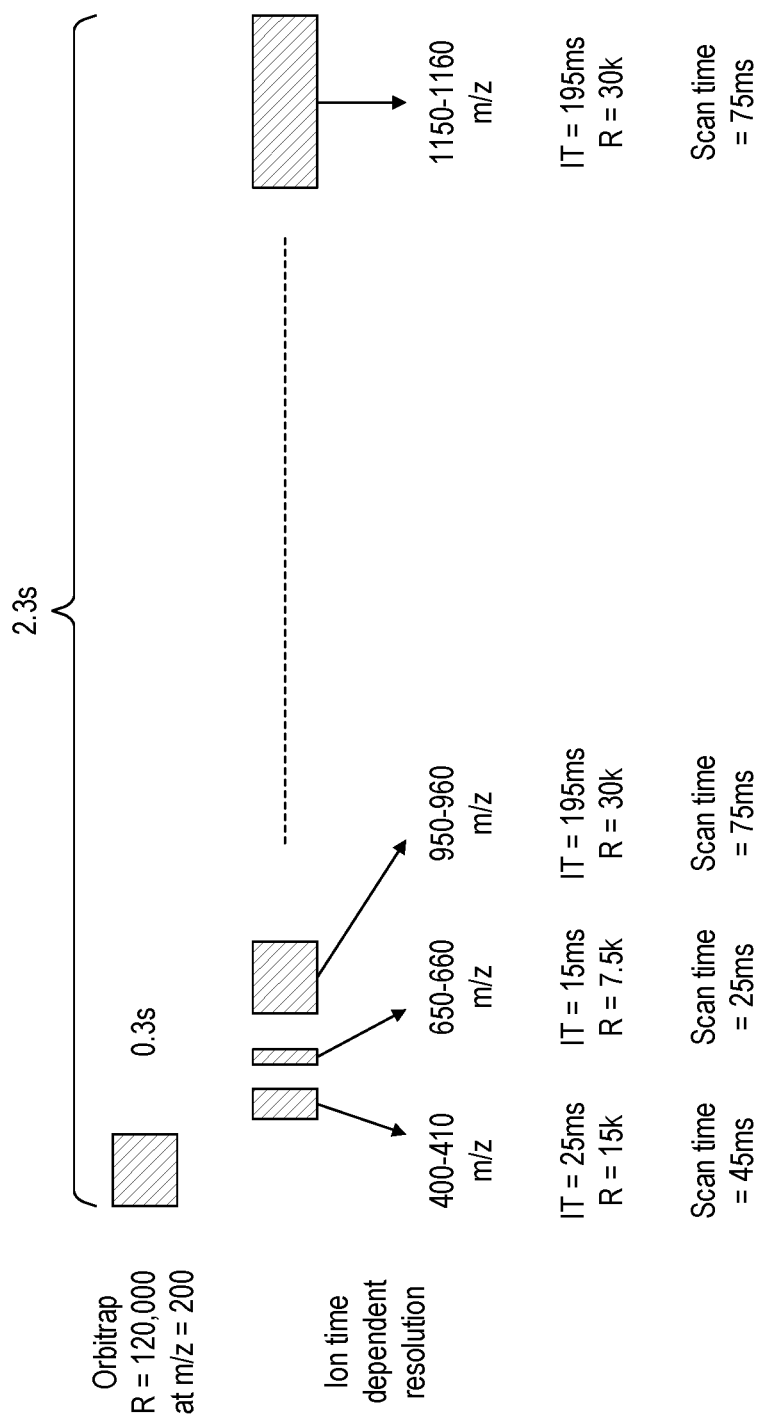
FIG. 4 shows a timing diagram representative of the dynamic adjustment of the MS2 scans according to an embodiment of the present invention.

An example of a dynamically controlled set of MS2 scans is shown in FIG. 4. FIG. 4 shows that the MS2 scan controls are determined based on the combination of the calculated ion injection time (IT) and the condition that the entire set of MS2 scans must be completed within 6 seconds such that the entire set of MS2 scans are still completed within the duration of a chromatographic peak, together with MS1 scans every 2.3 seconds at 120,000 resolution.

Preferably, the method may be further optimised to account for dynamic changes in the chromatographic peak supplied by LC column. In the exemplary embodiment, the peak width is 16 seconds. However, the skilled person will appreciate that in other embodiments the peak width may be different. The peak width may also dynamically vary due to variations in the chromatographic conditions. As such, in order to more accurately determine the duration of the chromatographic peak, and therefore more accurately determine the specified time period of the method, the peak width of the chromatographic peak may be determined dynamically (online determination). As such, based on a determined (predicted, measured) elution profile of the chromatographic peak, the sampling rate of the MS1 scan may be dynamically adjusted. Similarly, the sampling rate and/or durations (resolutions) of the MS2 scans may be dynamically adjusted. Preferably the sampling rate of the MS1 scan is dynamically adjusted in order to ensure that preferably 7 MS1 scans (or another preselected amount of MS1 scans, which is preferably at least 7 MS1 scans) are performed across the duration of the chromatographic peak. Preferably the scan rate is adjusted such that the MS1 scans are performed at approximately regular intervals across the chromatographic peak. As such, the interval time between the MS1 scans may be reduced if it is determined that the duration of the chromatographic peak is reduced. Alternatively, the interval time between the MS1 scans may be increased if it is determined that the duration of the chromatographic peak is increased. It is to be understood that the time intervals between the MS1 scans are used to perform the MS2 scans.

Advantageously, the present invention may be used to create a high resolution MS1-based quantitation DIA workflow, which can deliver high confidence of identification, and better precision of quantitation than approaches previously known in the art. In some embodiments, the present invention is capable of delivering 100% identification of all detectable features in a sample in the MS1 level and with a higher degree of sensitivity than quantitation in the MS2 level, as quantitation is performed prior to fragmentation of the sample precursors (i.e. with unfragmented precursors).

Furthermore, the methodology of the present invention may be utilised in combination with the traditional database search approach known from data dependent analysis (DDA) for the DIA data analysis, or other spectral library free algorithms to do the DIA data analysis and provide high confidence identification of precursors in the sample. In this way, the DIA methodology of the present invention does not require the building up a spectral library in advance, as is currently the case in known DIA methodologies. In addition, the methodology of the present invention improves the identification rate of peptides from the MS/MS scan by automatically matching the ion density, ion injection time and resolution settings for the MS/MS scans.

Figure 5:
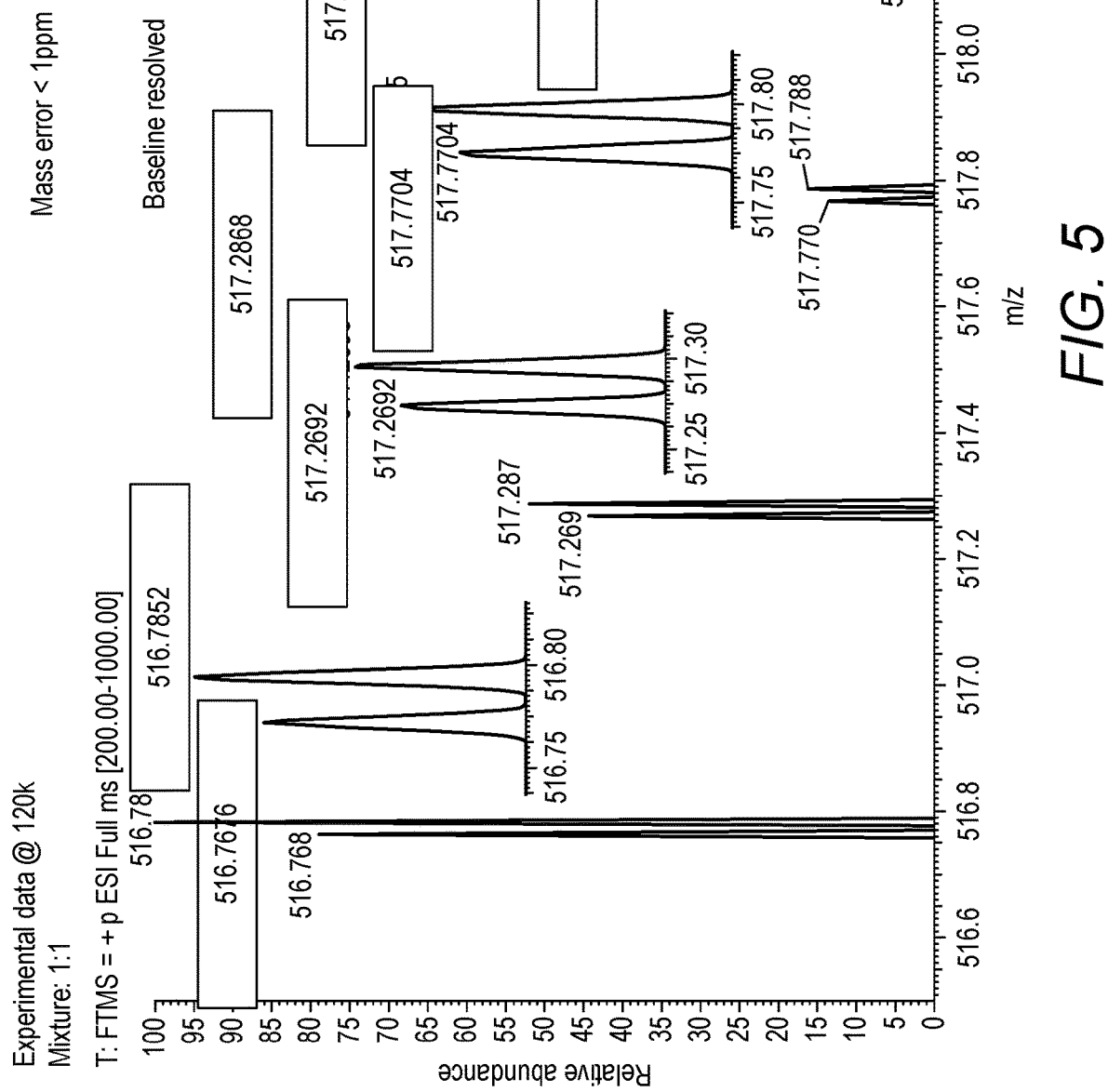
FIG. 5 shows an MS1 mass spectrum according to an embodiment of the present invention.

FIG. 5 discloses an exemplary mass spectrum produced by an embodiment of the invention. In this exemplary embodiment, a MS1 resolution of 120,000 was used. As a result of the relatively high resolution used in the MS1 domain, it is possible to distinguish between two different peptides with c.a. 30 ppm (parts per million) mass difference. In this exemplary embodiment, the two peptides are [Lys-des-Arg$^9$]-Bradykinin, monoisotopic mass, m/z=516.785 (2+), and [Val$^5$]-Angiotensin II, monoisotopic mass, m/z=516.767 (2+), which have a mass difference of 18 mmu.

The invention claimed is:

1. A data independent acquisition method of mass spectrometry for analysing a sample comprising the steps of:
    introducing the sample to a mass spectrometer during a period corresponding to a chromatographic peak;
    ionising the sample to produce a plurality of precursor ions;
    selecting a precursor mass range of interest for the sample to be analysed;
    performing a plurality of MS1 scans across the chromatographic peak, each of the MS1 scans comprising:
        scanning precursor ions of the sample across the precursor mass range of interest, using a mass analyser operated at a first, relatively higher resolution of at least 50,000 at m/z=200 amu, for identification and/or quantitation of the sample in the MS1 domain across the precursor mass range of interest; and
    obtaining a set of MS2 scans across the chromatographic peak by:
        segmenting the precursor mass range of interest into a plurality of precursor mass range segments, wherein for each precursor mass range segment:
            fragmenting the precursor ions within that mass range segment, and
            performing an MS2 scan of the fragmented mass range segment with the mass analyser, operated at a second, relatively lower resolution, such that each of the fragmented sample segments across the precursor mass range of interest is fragmented and scanned in the MS2 domain,
    wherein the performing of the MS1 scans are interleaved throughout the performing of each of the sets of MS2 scans such that the MS1 scans provide a mass chromatogram of the sample; and
    wherein a ratio of the number of MS1 scans performed to the number of sets of MS2 scans performed during a width of the chromatographic peak is at least 3:1, the width being equal to four standard deviations of the chromatographic peak.

2. A method according to claim 1, wherein the mass analyser is an orbital trapping mass analyser.

3. A method according to claim 1, wherein a resolution of the MS2 scans is less than half the resolution of the MS1 scans.

4. A method according to claim 1, wherein the first, relatively higher resolution of the mass analyser is at least 60,000.

5. A method according to claim 1, wherein the second, relatively lower resolution of the mass analyser is less than 30,000.

6. A method according to claim 1, wherein a resolution of the MS2 scans is variable for each mass range segment.

7. A method according to claim 1, wherein at least 3 MS1 scans are performed in the time taken to perform a set of MS2 scans.

8. A method according to claim 1, wherein the MS1 scans are interleaved at regular intervals between the MS2 scans.

9. A method according to claim 1, wherein at least 7 MS1 scans are performed within the width of the chromatographic peak.

10. A method according to claim 1, wherein two sets of MS2 scans are performed and at least 7 MS1 scans are performed within the width of the chromatographic peak.

11. A method according to claim 1, wherein the mass range of each precursor mass range segment mass of each sample segment is no greater than 10 Da.

12. A method according to claim 1, wherein a resolution of the MS2 scans is dynamically modified based on the results of the sample quantitation/identification in the immediately previous MS1 scan.

13. A method according to claim 1, wherein an injection time of the sample for each of the MS2 scans is dynamically modified based on the results of the sample quantitation/identification in the immediately previous MS1 scan.

14. A mass spectrometer for performing data independent acquisition mass spectrometry on a sample, the mass spectrometer comprising:
    an ionisation source for producing a plurality of precursor ions;
    a mass analyser;
    a fragmentation apparatus;
    a mass selector;
    a chromatography system configured to separate molecules of the sample upstream from the mass selector such that they are introduced to the mass spectrometer as a series of chromatographic peaks; and
    a controller configured:
    (i) to cause the mass selector to select a precursor mass range of interest for the sample to be analysed;
    (ii) to cause the mass analyser to operate at a first, relatively higher resolution of at least 50,000 at m/z=200 amu and to perform a plurality of MS1 scans across a chromatographic peak of the precursor ions of the sample across the precursor mass range of interest, for quantitation and/or identification of the sample in the MS1 domain across that precursor mass range of interest;
    (iii) to divide the precursor mass range of interest into a plurality of precursor mass range segments;
    (iv) to control the mass selector so as to segment the precursor mass range of interest into the said plurality of mass range segments;
    (v) for each precursor mass range segment generated by the mass selector, to control the fragmentation apparatus so as to cause fragmentation of the precursor ions within that mass range segment; and
    (vi) for each precursor mass range segment, to cause the mass analyser to operate at a second, relatively lower resolution and to perform an MS2 scan of that fragmented sample segment, such that each of the fragmented sample segments across the precursor mass range of interest is fragmented and scanned to form a set of MS2 scans,
    wherein steps (iv), (v) and (vi) are performed in sequence repeatedly across the chromatographic peak, and wherein the controller is configured to interleave the plurality of MS1 scans throughout the set of MS2 scans, such that a ratio of the number of MS1 scans performed to the number of sets of MS2 scans performed during a width of the chromatographic peak is at least 3:1, the width being equal to four standard deviations of the chromatographic peak.

15. A mass spectrometer according to claim 14, wherein the mass analyser is an orbital trapping mass analyser.

16. A mass spectrometer according to claim 14, wherein the controller is configured to cause the mass analyser to perform the MS1 scans at regular intervals.

17. A mass spectrometer according to claim 14, wherein the controller is configured to cause the mass analyser perform at least 7 MS1 scans within the width of the chromatographic peak.

18. A mass spectrometer according to claim 14, wherein the controller is configured to cause the mass analyser to perform two sets of MS2 scans and at least 7 MS1 scans within the width of the chromatographic peak.

19. A mass spectrometer according to claim 14, wherein the controller is configured to divide the precursor mass range of interest for the sample into a plurality of mass range segments each with a range of mass to charge ratios (m/z) no greater than 10 Da.

20. A mass spectrometer according to claim 14, wherein the controller is configured to cause the mass analyser to operate at the first, relatively higher resolution for the MS1 scans, that is at least double the second, relatively lower resolution of the MS2 scans.

21. A mass spectrometer according to claim 14, wherein the controller is configured to vary the resolution of the mass analyser when carrying out the MS2 scans, based on the results of the sample quantitation in the immediately previous MS1 scan carried out at the said first, relatively higher resolution.

22. A mass spectrometer according to claim 14, wherein the controller is configured to vary an injection time into the mass analyser for each of the MS2 segments when carrying out the MS2 scans, the injection time for the MS2 segments being based on the results of the sample quantitation in the immediately previous MS1 scan.

23. A mass spectrometer according to claim 14, further comprising
a processor configured to identify precursors present in the sample based on the MS1 scans and to validate the identification using the MS2 scans.

24. A mass spectrometer according to claim 23, wherein the processor is configured to access a data dependent analysis algorithm or a spectral-library-free algorithm, to identify precursors in the sample and validate the identification.

* * * * *